April 14, 1964 H. B. BASKIN 3,129,340
LOGICAL AND MEMORY CIRCUITS UTILIZING TRI-LEVEL SIGNALS
Filed Aug. 22, 1960
5 Sheets-Sheet 1

INVENTOR
HERBERT B. BASKIN
BY John F. Ohlandt Jr.
ATTORNEY

April 14, 1964 H. B. BASKIN 3,129,340

LOGICAL AND MEMORY CIRCUITS UTILIZING TRI-LEVEL SIGNALS

Filed Aug. 22, 1960

5 Sheets-Sheet 3

April 14, 1964 H. B. BASKIN 3,129,340

LOGICAL AND MEMORY CIRCUITS UTILIZING TRI-LEVEL SIGNALS

Filed Aug. 22, 1960

5 Sheets-Sheet 5

United States Patent Office 3,129,340

Patented Apr. 14, 1964

3,129,340

LOGICAL AND MEMORY CIRCUITS UTILIZING TRI-LEVEL SIGNALS

Herbert B. Baskin, Peekskill, N.Y., assignor to International Business Machines Corporation, New York, N.Y., a corporation of New York Filed Aug. 22, 1960, Ser. No. 51,162
8 Claims. (Cl. 307—88.5)

This invention relates to multivalued switching circuits and more particularly to circuits that embody ternary logical and memory functions.

Investigations of $n$-valued algebras and symbolic logics in which there are more than two truth values have stirred the imagination of mathematicians for the last 50 years. The deployment of $n$-valued logic in practical circuits has not been of great interest in the past, partly because of the preoccupation with the task of establishing a body of binary switching theory and partly because of the lack of suitable devices to synthesize $n$-valued logical functions. Although there has been some recent interest in ternary logic and in ternary logical devices, present day digital computers are designed and built using binary switching circuits exclusively.

The ultimate object of the present invention is to make more attractive the design of a non-binary computer. The approach taken to achieve this end is the development of circuits which will realize ternary and other $n$-valued logical functions but which employ only binary switches. A binary switch is an element that always exists in one of two possible states and is changed from one state to the other by reason of an input signal traversing a threshold value. This approach of realizing ternary compositions using only binary switches was arrived at by consideration of the low cost, high reliability and availability of these devices when compared with devices which are ternary in character.

Another object of the present invention is to achieve a functionally complete set of logical connectives so that any ternary function may be readily synthesized.

Another object is to provide a circuit synthesis by which any $n$-valued function of $m$ variables may be realized.

A further object is to provide a minimum set of logical circuits from which all of the one variable or "one place" ternary functions may be realized.

A specific object is to provide the function of ternary inversion.

Another specific object is to provide a ternary storage circuit.

A further specific object is to obtain ternary AND and OR operations by the use of simple circuits.

A feature of the present invention resides in a synthesis technique which may be described as partitioning of truth tables, that is to say, the $n$-valued networks are designed using binary switches and are derived from a topological point of view.

Another feature of the present invention resides in a synthesis technique which may be described as algebraic whereby the function to be realized is expanded in terms of more basic functions which have been previously selected and realized.

The foregoing and other objects, features and advantages of the invention will be apparent from the following more particular description of preferred embodiments of the invention, as illustrated in the accompanying drawings.

In the following discussion of circuits which realize ternary logical functions the binary switches employed are transistors. It will be understood, however, that any element meeting the definition of a binary switch may be similarly employed. In the discussion the following correspondence between digital values and electrical values obtains:

| D | E |
|---|---|
| 0 | −6 v. |
| 1 | 0 v. |
| 2 | +6 v. |

Figure 1:
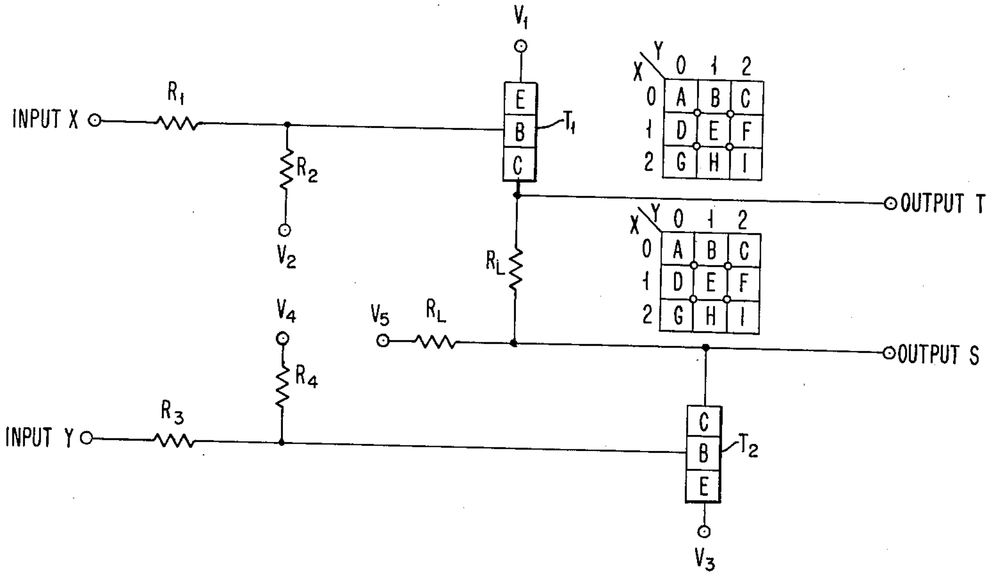
FIG. 1 is a general schematic diagram of the basic ternary logical circuit of the present invention.

Referring now to FIG. 1 there is shown a general schematic diagram wherein transistors $T_1$ and $T_2$, each having emitter, base and collector regions, designated E, B, and C respectively, are interconnected in a basic circuit illustrating an embodiment of the present invention. Input signals are applied at points X and Y to the respective biasing networks $R_1$, $R_2$, $V_2$ and $R_3$, $R_4$, $V_4$. The emitter of transistor $T_1$ is connected to potential $V_1$ and the emitter of transistor $T_2$ to potential $V_3$. The collectors of $T_1$ and $T_2$ are connected to two load resistors $R_L$ and a source of supply potential $V_5$. The output terminals T and S are connected to the collectors of $T_1$ and $T_2$ respectively. The truth tables immediately above the output lines serve to indicate the relationship between the outputs and the various inputs.

The circuit of FIG. 1, which employs only two conventional transistors operating in either the saturated or cut-off states, is considered as a combinatorial element that can assume any one of 4 states. Referring now to the truth tables above the output lines of this circuit, it will be seen that a circle has been placed at the four intersections of the lines defining the rows and columns of the truth tables, showing that the truth tables have been partitioned. These points of intersections will be referred to as "origins" and they uniquely determine the manner in which the input variables have been grouped. Calling the origin $\phi_1$ where the intersection is upper left, $\phi_2$ where it is upper right, $\phi_3$ where it is lower left, $\phi_4$ where it is lower right, it will be appreciated that when the point of intersection or the origin is $\phi_1$ this represents a circuit arrangement whereby the state of transistor $T_1$ changes when the digital value at input X changes from 0 to 1 and the state of transistor $T_2$ likewise changes when the digital value at input Y changes from 0 to 1. When, however, the input of intersection is at origin $\phi_2$, this represents a circuit arrangement whereby the state of transistor $T_1$ changes when the digital value at input X changes from 0 to 1 and the state of transistor $T_2$ changes when the value at input Y changes from 1 to 2. The various partitionings will be explained in detail by reference to specific circuits.

Figure 2:
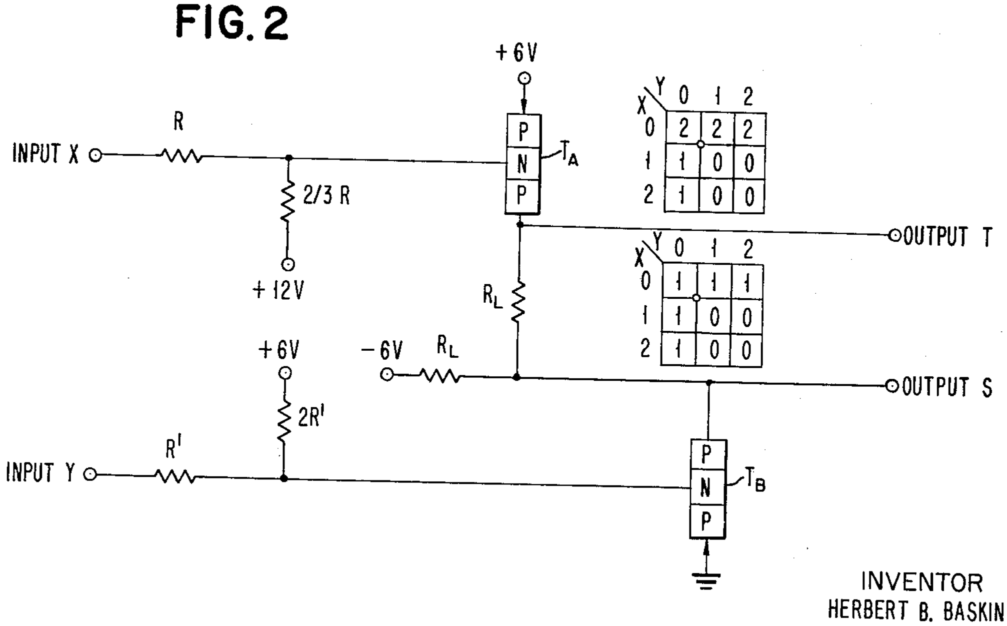
FIGS. 2 and 3A are schematic diagrams of specific ternary logical circuits.

Referring now to FIG. 2, there is shown a basic ternary logical circuit wherein particular values of biasing and supply potentials and relative values of input resistors are specified. The truth tables for this circuit indicate that the point of intersection, or origin, is $\phi_1$. The input biasing network for transistor $T_a$ is designed so that transistor $T_a$ is switched from the "off" to the "on" state as the signal at point X changes from a digital 1 to digital 0, that is, from 0 v. to —6 v. This will be appreciated from the fact that, for a PNP transistor, when the base is negative with respect to the emitter, a condition of forward bias obtains with the result that the transistor has a high output current from the collector, or in other words, the impedance of the transistor is low. Such a condition exists when the signal potential at input X is —6 v. since the base potential will then be +4.8 v. and will thus be negative with respect to the potential at the emiter which is +6 v. However, when the signal potential at input X is 0 v., the base potential will then be +7.2 v. and will thus be positive with respect to the emitter potential which is +6 v. A condition of reverse bias between base and emitter then obtains and the transistor $T_a$ will be "cut off."

In a similar manner, the input biasing network for transistor $T_B$ is designed so that $T_B$ is switched from the off to the on state as the input value at Y changes from a digital 1 to a digital 0, or from 0 volts to —6 volts. When the input value at Y is 0 volts the potential at the base of $T_B$ is +2 volts and therefore positive with respect to the emitter which is at ground potential. When the input value at Y is —6 volts, the potential at the base of $T_B$ is —2 volts or negative with respect to the emitter.

It will be appreciated from the preceding explanation of the operation of the circuit of FIG. 2 that the truth tables above the respective outputs T and S are accurate representation of the truth values of the outputs in relation to the truth values of the inputs. Consider the output T and the truth table above the output. Let it be assumed that the input at X has the truth value 0 and the input at Y also has the true value 0. Both transistors will then be on, with the result that both transistors have effectively no voltage drop across them. The potential at output T is therefore +6 v. or the output truth value is 2. When the input at X has the value 0 and the input at Y has the values 1 or 2, transistor $T_B$ will turn off but transistor $T_A$ will remain on and the truth value at output T will be 2 in both cases. Thus, the entries in the first row of the truth table above output T are verified. A similar analysis applies to the other rows of this truth table as well as to the truth table above output S.

Figure 3A:
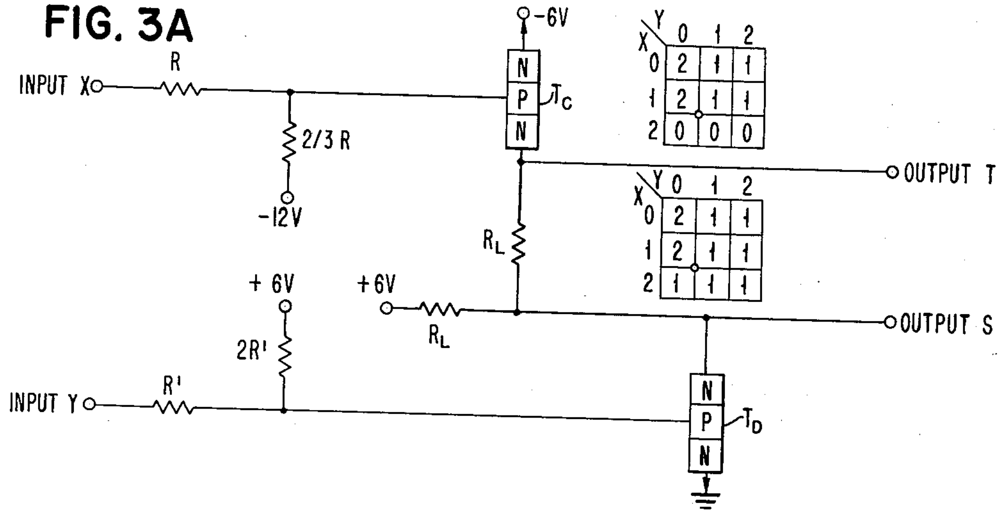

Referring now to FIG. 3A, another basic ternary logical circuit is shown wherein NPN transistors are employed. The collector supply potential is now +6 v. and the input bias supply for transistor $T_c$ is —12 v. Otherwise, the circuit is the same as that shown in FIG. 2. The respective input biasing networks are designed so that transistor $T_c$ switches from the off to the on state as the input value at X changes from a digital 1 to a digital 2 and transistor $T_D$ switches from the off to the on state as the input value at Y changes from 0 to 1. With this circuit ternary logical functions as indicated by the truth tables are realized at the respective outputs T and S.

Thus far, two basic ternary logical circuits, each employing only two transistors, have been presented in FIGS. 2 and 3A. As will be further explained hereinafter, because these two logical circuits may be utilized to obtain any one place function, they are considered as essential connectives.

Other possible variations of the general circuit of FIG. 1 may be achieved by changing the biasing networks, thus moving the origin, and by using a combination of different polarity transistors. A simple variation may be obtained by commuting of the variables, that is, the inputs for the $x$ and $y$ variables may be interchanged. It has been calculated that 252 truth tables may be achieved by the many modifications that may be formed, by systematically exhausting all of the possible variations.

It will be apparent to those skilled in the art that the technique of partitioning of truth tables is a general one and may be extended to any $n$-value case.

Figure 3B:
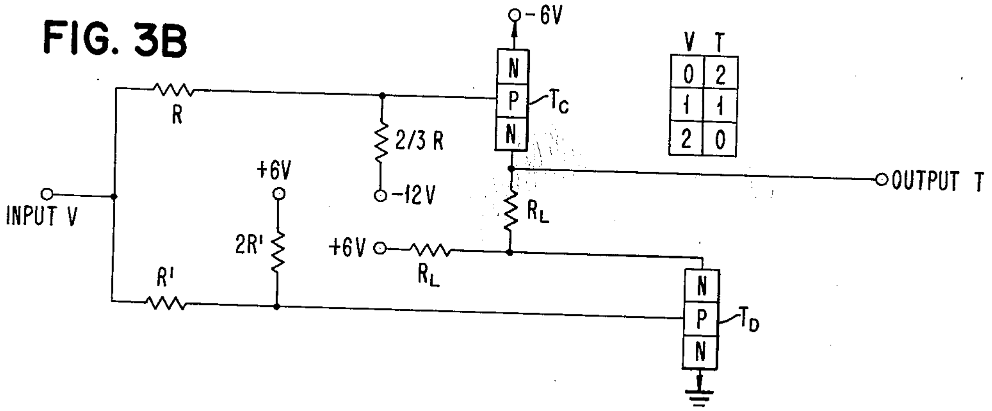
FIG. 3B is a schematic diagram of a ternary inverter circuit.

Referring to FIG. 3B, it will be seen that this circuit is a duplicate of that shown in FIG. 3A, except that the inputs to the transistors have been connected together to form a single input, designated input V. It will be apparent from the previous analysis that this circuit will yield an input to output relationship as shown by the one place truth table above output T. When the input truth value is 0, transistor $T_C$ is off and transistor $T_D$ is off. The output truth value is therefore 2. When the input value is 1, transistor $T_C$ is off and transistor $T_D$ is on and the output value is 1. When the input value is 2, $T_C$ is on and $T_D$ is on and the output value is 0. Thus, the circuit of FIG. 3B performs the operation of ternary inversion.

Figure 4:
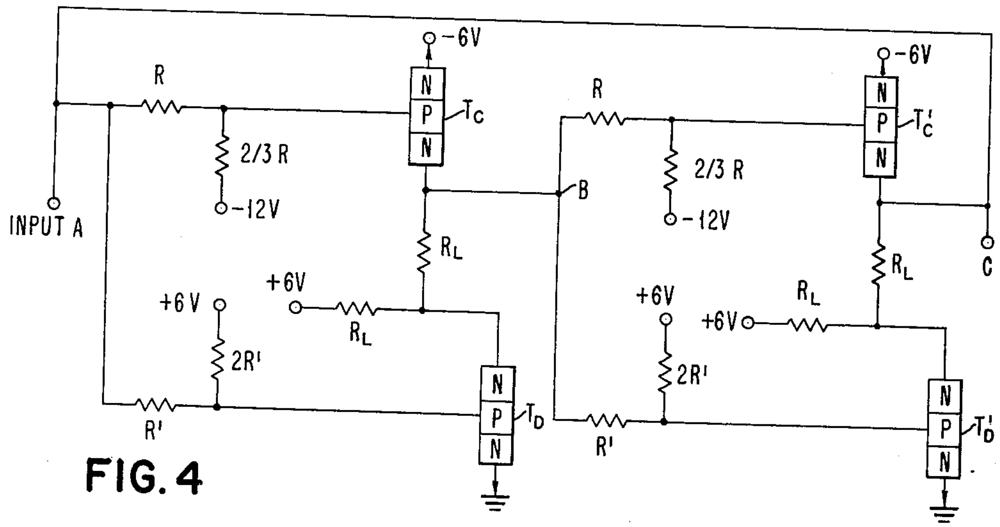
FIG. 4 is a schematic diagram of a ternary storage circuit.

A ternary storage or memory circuit is synthesized in FIG. 4, wherein two identical ternary inverters, as shown in FIG. 3B, have been connected output to input. A ternary storage circuit or device is defined as one capable of assuming three stable states, each stable state representing the storage of one of the three digital values in the ternary information system. The operation of the storage circuit of FIG. 4 will be apparent from the description of operation of the ternary inverter of FIG. 3B. When the input at terminal A is —6 v., or a truth value of 0, the output at terminal B will be +6 v., in accordance with the inversion operation. Since this represents the input to the second inverter, the output thereof at terminal C is —6 v. This in turn represents the input to the first inverter and so the input at terminal is maintained at —6 v. This condition corresponds to the storage of a digital 0, and is the first stable state. Likewise, it will be appreciated that when the input at terminal A is 0 volts or a truth value of 1, this condition will be maintained by the action of the circuit and will correspond to the storage of a digital 1, which is the second stable state. When the input at terminal A is +6 v., or a truth value of 2, this condition will correspond to the storage of that digit, which is the third stable state.

Figure 6:
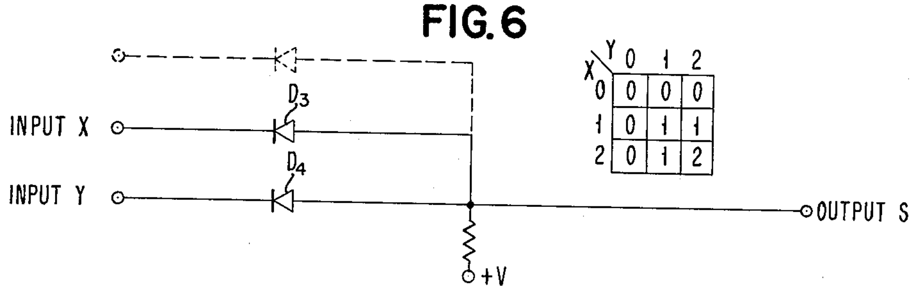
Figure 7:
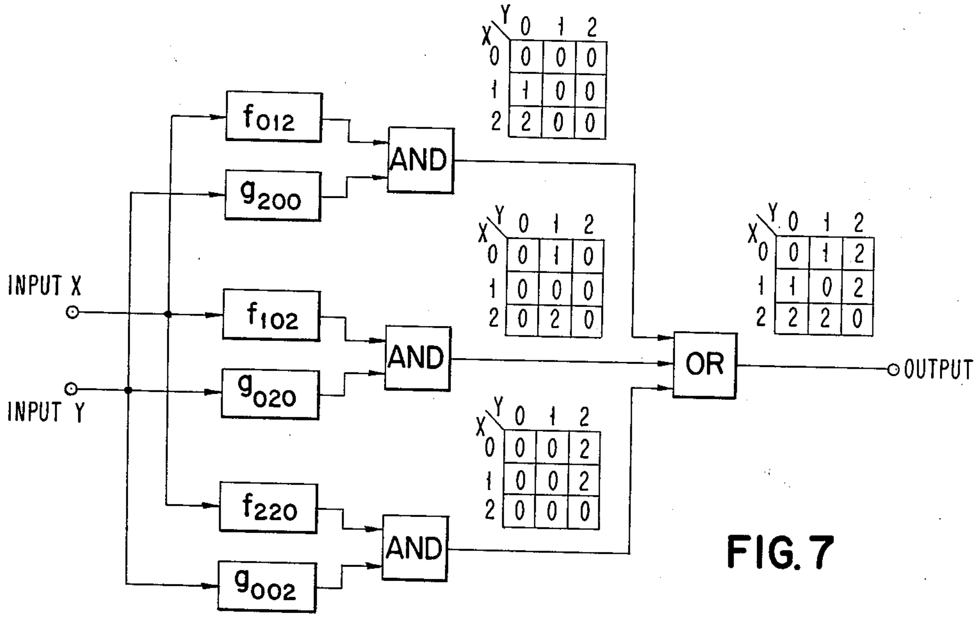
FIG. 7 is a general block diagram of a circuit capable of synthesizing any ternary logical function.

Referring now to FIG. 6 and FIG. 7, the circuits shown therein are the well known diode OR and AND logical operators, now serving to perform generalized versions of the OR and AND operations. In algebraic terms, of course, these circuits are sum and product operators respectively. A useful way of describing the generalized OR, or GOR operation, and the generalized AND, or GAND operation, is as follows: The output of a GOR circuit has a truth value corresponding to the highest truth value of the inputs. The output of a GAND circuit has a truth value corresponding to the lowest truth value of the inputs. Another way of expressing this is to say that the GOR operator is a "maximum" operator and the GAND operator is a "minimum" operator. These descriptions, being perfectly general, apply to all $n$-valued logic. They may be verified as accurate by reference to the truth tables adjacent the respective circuits of FIGS. 6 and 7 where the relationship between outputs and coordinate inputs is graphically indicated for the ternary case.

Considering the operation of the diode GOR circuit, the potential —V is more negative than any of the input signal potentials representing truth values. When the inputs, for example, at X and Y, are at the same potential, that is, they have the same truth value, both diodes $D_1$ and $D_2$ will be forward biased and hence, the truth value appearing at both inputs will appear at the output. When, however, one input is at a higher potential than the other, that is, at a higher truth value, the diode connected to that input will be forward biased which means that the other diode will be reversed biased. Hence the higher truth value will appear at the output S.

A similar analysis applies to the GAND circuit of FIG. 7. However, the supply potential is now at a value +V, which is more positive than any input signal potential. A condition of forward bias or no voltage drop exists for both diodes when both input potentials are the same but when the input potentials differ, such a condition obtains only for that diode having the lower potential at its input.

A general systematic approach to the problem of synthesizing ternary logical functions will now be discussed. This approach will set the upper bounds on the logic complexity and will serve to demonstrate that a set of connectives which includes the generalized OR and AND operations is functionally complete if all of the one place functions may be realized by this set.

A function of two variables in ternary logic may be expressed as follows:

$$f(x, y)=f_0(x)\cdot G_0(y)+f_1(x)\cdot G_1(Y)+f_2(x)\cdot G_2(y) \quad (1)$$

or $$f(x, y)=\sum_{i=0}^{z} f_i(x)\cdot G_i(y)$$

From the expression it will be appreciated that any ternary function of two variables, or a "two place function," may be realized simply as the sum of the products of the particular, or "*f*," functions, of one variable and the constant, or "G," functions, of the other variable. In physical terms, this means that by suitable connections using AND and OR circuits with circuits designed to realize the functions of one variable, or "one place functions," any ternary function of two variables may be readily obtained.

Let it be desired that a ternary function of two variables be obtained so as to satisfy the truth table below:

| Y / X | 0 | 1 | 2 |
|---|---|---|---|
| 0 | 0 | 1 | 2 |
| 1 | 1 | 0 | 2 |
| 2 | 2 | 2 | 0 |

The circuit synthesis that will satisfy this truth table and thus give the desired function is shown in FIG. 7. It will be seen that there has been connected to an AND operator a function generator for the *y* variable, that is, $g_{200}$ or $G_0$, and a particular function generator $f_0$ for the *x* variable, which in this particular case is $f_{012}$, corresponding to the first column of the truth table, to obtain the product namely $f_0(x)\cdot G_2(y)$. Similarly $f_1(x)\cdot G_1(y)$ and $f_2(x)\cdot G_2(y)$ are obtained. These products are then "summed" by connecting the outputs of the AND operators to an OR operator and the final output corresponds to the desired function.

That the truth table shown adjacent the output of the circuit of FIG. 7 accurately represents the relationship between output and inputs may be easily checked by recalling that the generalized AND and OR operators are "minimum" and "maximum" operators respectively, that is, where two inputs are involved, the output of the AND circuit will be equal to the lower of the inputs and the output of the OR circuit will be equal to the higher of the inputs. For example, assume that the input at Y has the truth value of 0 and that the input at X varies 0→1→2. Under these conditions, the $g_{200}$ one place operator in the top channel will have an output of 2 and the 0 operator, which in this case is $f_{012}$, will have an output that varies 0→1→2. The output from the top AND circuit is a minimum function, and, therefore, the output will vary 0→1→2. The other AND circuits will be putting out zeros. The output from the OR circuit is a maximum function; hence the output therefrom will vary 0→1→2. When Y is 1 and X varies 0→1→2 the middle channel AND circuit permits transmission while the other two AND circuits will be putting out zeros. When Y is 2 the bottom channel permits transmission. The final outputs are as shown in the truth table.

It will thus be seen that the parallel states arrangement as embodied in FIG. 7 is one where the truth value of the input at Y determines which parallel channel allows transmission. A dual parallel states arrangement can easily be derived whereby the input at X would govern. It would be based on the dual expansion:

$$f(x, y)=[g_{022}(x)+f_0(y)]\cdot[g_{202}+f_1(y)]\,[g_{200}(x)+f_2(y)] \quad (2)$$

The realization therefore would be the "product of sums."

The general approach discussed above, predicated on what may be termed a "functional form" composition, may be simply extended to *n*-valued functions of any number of variables.

It is clear that by induction the expansion theorem of Equation 1 may be extended to functions of two variables in *n*-valued logic as follows:

$$f(x,y)=\sum_{i=0}^{n-1} f_i(x)\cdot G_i(y) \quad (3)$$

where *x* and *y* are *n*-valued variables. Similarly a function of *m* variables may be expanded in terms of function of $m-1$ variables as follows:

$$f(x_1, x_2 \ldots x_m)=\sum_{i_1=0}^{n-1} f_{i_1}(x_1, x_2 \ldots x_{m-1})\cdot G_{i_1}(x_m) \quad (4)$$

In Equation 4 we have generalized the upper limit of the summation since it was shown that by inductive reasoning these results are applicable for all *n*. If $f_{i_1}(x_1, x_2 \ldots x_{m-1})$ of Equation 4 is replaced by its expansion in terms of functions of $m-2$ variables the following expansion obtains:

$$f(x_1, x_2, x_3 \ldots x_m) = \sum_{i_1, i_2=0}^{n-1} f_{i_1, i_2}(x_1, x_2 \ldots x_{m-2})\cdot G_{i_2}(x_{m-1})\cdot G_{i_1}(x_m) \quad (5)$$

where $f_{i_1, i_2}(x_1, x_2 \ldots x_{m-2})$ is suitably chosen.

Similarly, by induction we get:

$$f(x_1, x_2 \ldots x_m) = \sum_{i_1, i_2 \ldots i_{m-1}=0}^{n-1} f_{i_1, i_2 \ldots i_{m-1}}(x_1)\cdot G_{i_{m-1}}(x_2)\cdot G_{i_{m-2}}(x_3)\cdot G_{i_1}(x_m) \quad (6)$$

where $f_{i_1, i_2 \ldots i_{m-1}}(x_1)$ is suitably chosen.

Equation 6 represents a general expression for the realization of any function of *m* variables in any *n*-valued logic in terms of the one place functions of that logic and the GOR and GAND connectives. The use of this expansion theorem gives us a systematic procedure for the synthesis of *n*-valued networks.

It has been shown that by the circuit arrangement of FIG. 7 any ternary function of two variables or "a two-place function" may be obtained if the one-place functions are realizable. In a ternary system there are 27 one-place functions since for each of the three input truth values the output may assume any of the truth values. There are thus $3^3$ combinations involved. In the discussion of the circuits of FIGS. 2 and 3A, it was previously stated that these circuits have been determined to be essential connectives. What this means is that by utilizing only these circuits and the AND and OR operators all of the 27 one-place functions may be realized. It follows therefore that any two-place ternary function may be synthesized with only these basic circuits. A set of these basic circuits thus constitutes a functionally complete set.

The chart below contains a tabulation of all of the one-place functions and also serves to indicate the manner in which each may be realized. Where the realization is trivial or comparatively simple to visualize a short description has been given of the connection. Where the realization is rather complex, reference may be had to FIGS. 8–21, which are block diagrams of these one-place realizations. In the upper left hand corner of these diagrams the particular one-place function being realized is indicated.

Figure 5:
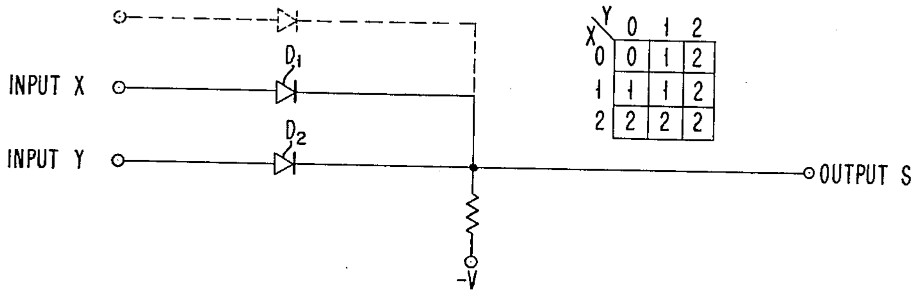
FIGS. 5 and 6 are schematic diagrams of circuits used as ternary AND and OR operators respectively.
Figure 8:
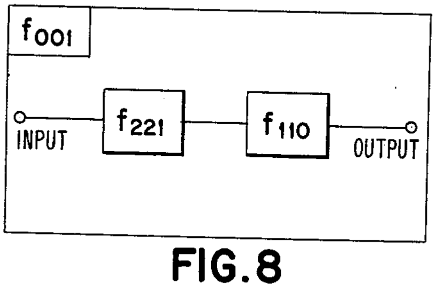
FIGS. 8–21 are block diagrams illustrating the way of interconnecting the basic circuits previously derived in order to obtain certain of the ternary one-place functions.
Figure 9:
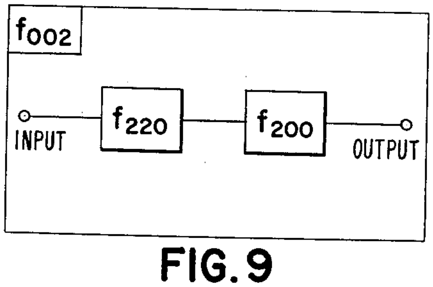
Figure 10:
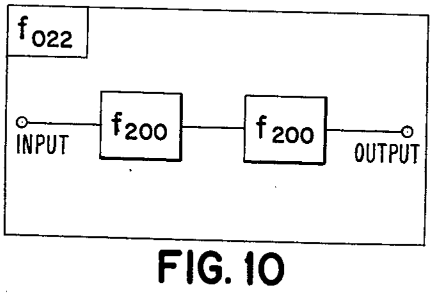
Figure 11:
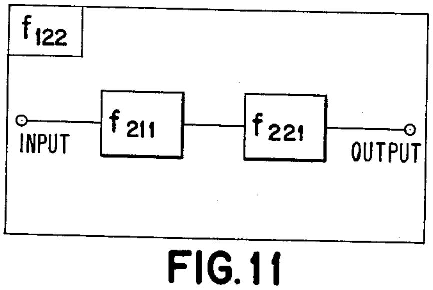
Figure 12:
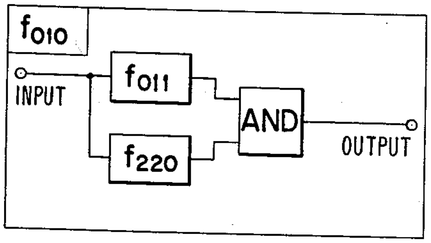
Figure 13:
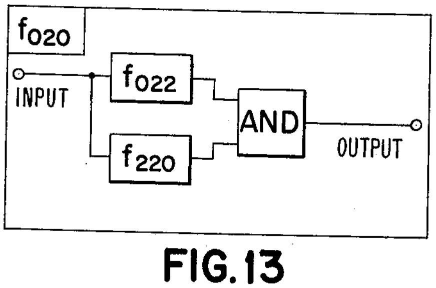
Figure 14:
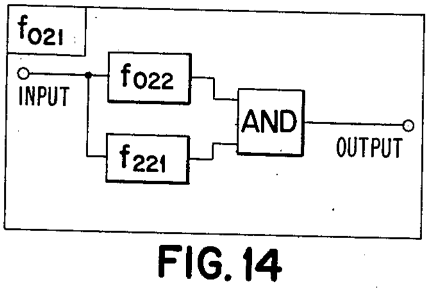
Figure 15:
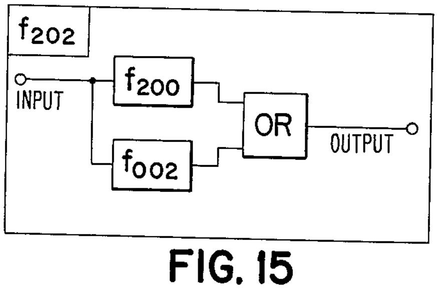
Figure 16:
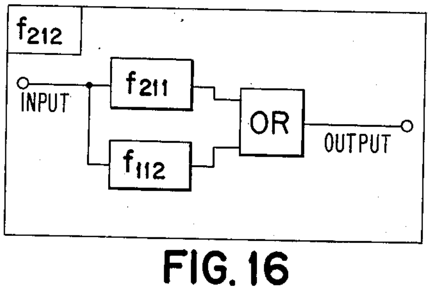
Figure 17:
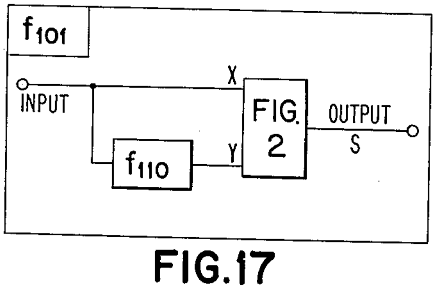
Figure 18:
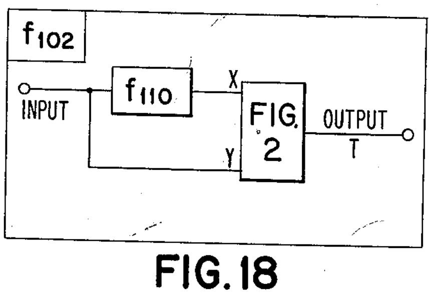
Figure 19:
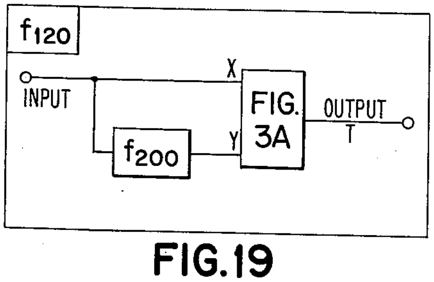
Figure 20:
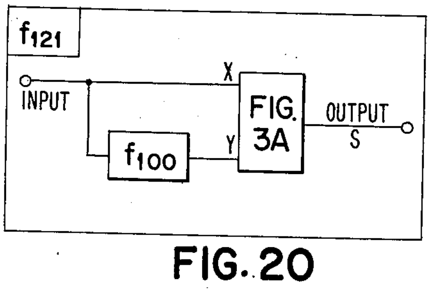
Figure 21:
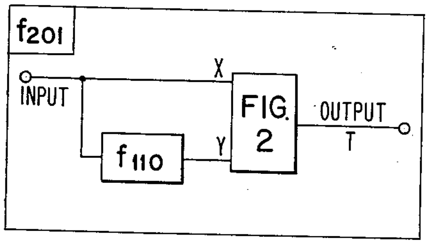

| One Place Function Operators | Realization | Circuit Arrangement | Number of Components Required |
|---|---|---|---|
| $f_{000}$ | trivial | Constant source of value "0" (−6 v.) | 0 |
| $f_{001}$ | From Fig. 3A | See Fig. 8 | 2T |
| $f_{002}$ | From Fig. 3A and Fig. 2. | See Fig. 9 | 2T |
| $f_{010}$ | From Fig. 6 and Fig. 3A. | See Fig. 12 | 1T and 4D |
| $f_{011}$ | From Fig. 6 | Connect input Y to Ground. | 2D |
| $f_{012}$ | trivial | Short circuit | 0 |
| $f_{020}$ | From Fig. 2 and Fig. 3A and Fig. 6. | See Fig. 13 | 3T and 2D |
| $f_{021}$ | From Fig. 2 and Fig. 3A. | See Fig. 14 | 3T and 2D |
| $f_{022}$ | From Fig. 2 | See Fig. 10 | 2T |
| $f_{100}$ | From Fig. 2 | Use only bottom half of circuit including $T_A$, single $R_L$, output S. | 1T |
| $f_{101}$ | From Fig. 2 and Fig. 3A. | See Fig. 17 | 3T |
| $f_{102}$ | From Fig. 2 and Fig. 3A. | See Fig. 18 | 3T |
| $f_{110}$ | From Fig. 3A | Use only top half of circuit including $T_C$, single $R_L$, output T. | 1T |
| $f_{111}$ | trivial | Constant source of value "1" (ov.). | 0 |
| $f_{112}$ | From Fig. 5 | Connect input Y to Ground. | 2D |
| $f_{120}$ | From Fig. 3A and Fig. 2. | See Fig. 19 | 3T |
| $f_{121}$ | From Fig. 2 and Fig. 3A. | See Fig. 20 | 3T |
| $f_{122}$ | From Fig. 3A | See Fig. 11 | 2T |
| $f_{200}$ | From Fig. 2 | Use only part of circuit including $T_A$, both $R_L$, −6 v., output T. | 1T |
| $f_{201}$ | From Fig. 2 and Fig. 3A. | See Fig. 21 | 3T |
| $f_{202}$ | From Fig. 2, Fig. 3A and Fig. 5. | See Fig. 15 | 3T and 2D |
| $f_{210}$ | From Fig. 3B | Entire circuit of Fig. 3B | 2T |
| $f_{211}$ | From Fig. 3A | Use only bottom half of circuit including $T_D$, single $R_L$, output S. | 1T |
| $f_{212}$ | From Fig. 3A and Fig. 5. | See Fig. 16 | 1T and 4D |
| 220 | From Fig. 3A | Use only part of circuit including $T_C$ and both $R_L$, +6 v., output T. | 1T |
| $f_{221}$ | From Fig. 3A | Use only part of circuit including $T_C$ and both $R_L$, +6 v., output S. | 1T |
| $f_{222}$ | trivial | Constant source of value "2" (+6 v.). | 0 |

It will be appreciated that the functional form composition is based on a general approach to the problem of synthesis and determines the upper bounds of circuit complexity. However, it is possible to employ simplification techniques to reduce the circuit complexity for a given case. An obvious possibility for simplification exists whenever two adjacent rows or columns of a given truth table, corresponding to a desired function, have identical entries. In this situation, only two of the three channels shown in FIG. 7 need be employed and the constant one-place function operator will be of the form which will yield a truth value of 2, when the X or Y variable has either of two adjacent values, that is, when 0 or 1 or when 1 or 2.

What has been achieved by the present invention is a group of basic circuits which in accordance with the techniques advanced herein, may be specifically utilized to provide any ternary logical function, as well as ternary memory or storage and further may be generally utilized to provide *n*-valued logical functions. These circuits require only the simplest elements, namely binary switches, as the active devices.

While the invention has been particularly shown and described with reference to preferred embodiments thereof, it will be understood by those skilled in the art that various changes in form and details may be made therein without departing from the spirit and scope of the invention.

What is claimed is:

1. A ternary logical circuit comprising a plurality of interconnected active elements, operable in either the high current or the low current state, and each having an input for receiving signals of three different amplitude values, each signal value corresponding to only a single one of three different digital values, means for regulating the states of each of said active elements responsive to the variation among said three values of input signals at the respective inputs, output means common to said active elements for providing three different amplitude values of output signals corresponding in value to the different values of input signals in accordance with the combination of states of said active elements, said output means including a power source and a load impedance means, said load impedance means having a midpoint, and means connecting one of said active elements to said midpoint.

2. A ternary logical circuit as defined in claim 1 wherein the active elements are transistors.

3. A ternary logical circuit comprising a plurality of interconnected active elements each operable in either the high current or the low current state, and each having an input for receiving signals of three different amplitude values, each signal value corresponding only to a single one of three different digital values, means for regulating the respective states of each of said active elements according to whether the digital value of the signals at the respective inputs is zero, or greater than zero, output means common to said active elements for providing three different amplitude values of output signals corresponding in value to the different values of input signals in accordance with the combination of states of said active elements, said output means including a power source and a load impedance means, said load impedance means having a midpoint, and means connecting one of said active elements to said midpoint.

4. A ternary logical circuit comprising a plurality of interconnected transistors, each operable in either the high current or the low current state, and each having an input for receiving signals of three different amplitude values, each signal value corresponding to only a single one of three different digital values, means for operating said transistors in their low current state when the digital value of the signals at their respective inputs is zero, for operating the transistors in their high current state when the digital value of the signals at their respective inputs is greater than zero and output means common to said transistors for providing three different amplitude values of output signals corresponding in value to the different values of input signals in accordance with the combination of states of said transistors, said output means including a power source and a load impedance means, said load impedance means having a midpoint, and means connecting one of said transistors to said midpoint.

5. A ternary logical circuit comprising a pair of interconnected transistors, each operable in either the high current or the low current state and each having an input for receiving signals of three different amplitude values, each signal value corresponding to only a single one of three digital values, means connected at the input for operating the first of said pair of transistors in its low current state when the digital value of the signals at its input is zero and in the high current state when the digital value of the signals is greater than zero, means connected at the input for operating the second of said pair of transistors in its high current state when the digital value of the signals at its input is two, for operating the second of said pair of transistors in its low current state when the digital value of the signals at its input is less than two, output means common to said pair of interconnected transistors for providing three different amplitude values of output signals corresponding in value to the different values of input signals in accordance with the combination of states of said transistors, said output means including a power source and a load impedance means, said load impedance means having a midpoint, and means connecting one of said transistors to said midpoint.

6. A ternary logic circuit as defined in claim 5 including means for joining the inputs to said transistors whereby the function of ternary inversion is achieved.

7. A ternary inverter circuit comprising a pair of interconnected switches, operable in either one of two possible states and each having an input for receiving signals of three different amplitude values, means for operating the first of said pair of switches in its first state when the digital value of the signals at its input is zero and for operating in said second state when the digital value is greater than zero, means for operating the second of said pair of interconnected switches in its second state when the digital value of the signals at its input is two and for operating in the first state when the digital value is less than two, output means common to said pair of interconnected switches for providing an output signal having a digital value of two when the input has a digital value of zero, for providing an output signal having a digital value of one when the input signal has a digital value of one, for providing an output signal having a digital value of zero when the input signal has a digital value of two, said output means including a power source and a load impedance means, said load impedance means having a midpoint, and means connecting one of said switches to said midpoint.

8. A ternary storage circuit comprising a pair of ternary inverter circuits each as defined in claim 7 and including means for connecting the output of each inverter circuit to the input of the other.

References Cited in the file of this patent

UNITED STATES PATENTS

| | | |
|---|---|---|
| 2,577,475 | Miller | Dec. 4, 1951 |
| 2,901,640 | Steinman | Aug. 25, 1959 |
| 2,950,461 | Tryon | Aug. 23, 1960 |
| 2,964,653 | Cagle et al. | Dec. 13, 1960 |
| 2,971,696 | Henle | Feb. 14, 1961 |